(12) United States Patent
Nair

(10) Patent No.: US 8,703,834 B2
(45) Date of Patent: *Apr. 22, 2014

(54) PREPARATION OF CROSSLINKED ORGANIC POROUS PARTICLESRELATED APPLICATIONS

(75) Inventor: Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/192,541

(22) Filed: Jul. 28, 2011

(65) Prior Publication Data

US 2013/0030070 A1 Jan. 31, 2013

(51) Int. Cl.
*C08J 9/26* (2006.01)
*C08J 9/28* (2006.01)
*C08J 9/30* (2006.01)

(52) U.S. Cl.
USPC ............... 521/69; 521/61; 521/63; 521/64; 521/65

(58) Field of Classification Search
USPC ................... 521/65, 69, 61, 63, 64
See application file for complete search history.

(56) References Cited

U.S. PATENT DOCUMENTS

| | | | |
|---|---|---|---|
| 3,957,741 A | | 5/1976 | Rembaum et al. |
| 4,137,380 A | * | 1/1979 | Gunning et al. ............. 521/62 |
| 4,363,888 A | * | 12/1982 | Willison et al. ............ 523/502 |
| 4,461,849 A | * | 7/1984 | Karickhoff .................. 521/64 |
| 4,775,699 A | | 10/1988 | Cozens |
| 5,385,803 A | | 1/1995 | Duff et al. |
| 5,450,190 A | | 9/1995 | Schwartz et al. |
| 5,646,193 A | * | 7/1997 | Brownscombe et al. ....... 521/63 |
| 5,902,834 A | * | 5/1999 | Porrvik ...................... 521/62 |
| 6,780,942 B2 | | 8/2004 | Leon et al. |
| 7,754,409 B2 | | 7/2010 | Nair et al. |
| 8,110,628 B1 | * | 2/2012 | Nair et al. ................. 524/501 |
| 8,241,828 B2 | * | 8/2012 | Bennett et al. ........... 430/137.16 |
| 8,252,414 B2 | * | 8/2012 | Putnam et al. .............. 428/402 |
| 2005/0169946 A1 | * | 8/2005 | Lannibois et al. ............ 424/401 |
| 2007/0275076 A1 | * | 11/2007 | Chattopadhyay et al. .... 424/489 |
| 2008/0176157 A1 | | 7/2008 | Nair et al. |
| 2010/0021838 A1 | | 1/2010 | Putnam et al. |
| 2011/0136059 A1 | * | 6/2011 | Yang ...................... 430/137.14 |
| 2012/0136080 A1 | * | 5/2012 | Yang et al. ................... 521/65 |

FOREIGN PATENT DOCUMENTS

| | | |
|---|---|---|
| EP | 2025525 | 2/2009 |
| WO | 2007/051035 | 5/2007 |

OTHER PUBLICATIONS

C. M. Cheng, J. W. Vanderhoff, and M. S. El-Aasser, *J.Polym.Sci.: Part A, Polymer Chemistry*, vol. 30, pp. 245-256, 1992.
U.S. Appl. No. 12/984,030, titled "Porous Particles With Multiple Markers" filed Jan. 4, 2011 by Nair et al.
U.S. Appl. No. 12/984,044, titled "Preparation of Porous Particles With Multiple Markers" filed Jan. 4, 2011 by Nair et al.
U.S. Appl. No. 12/984,055, titled "Articles With Porous Particles for Security Purposes" filed Jan. 4, 2011 by Nair et al.
U.S. Appl. No. 13/192,531, titled Laser-Engraveable Compositions and Flexographic Printing Precursors filed Jul. 28, 2011 by Landry-Coltrain et al.
U.S. Appl. No. 13/192,533, titled Laser-Engraveable Compositions and Flexographic Printing Precursors filed Jul. 28, 2011 by Landry-Coltrain et al.
U.S. Appl. No. 13/192,544, titled "Article and System With Crosslinked Organic Porous Particles" filed Jul. 28, 2011 by Nair et al.
U.S. Appl. No. 13/192,521, titled "Crosslinked Organic Porous Particles" filed Jul. 28, 2011 by Nair.

* cited by examiner

*Primary Examiner* — Melissa Rioja
(74) *Attorney, Agent, or Firm* — J. Lanny Tucker

(57) ABSTRACT

Crosslinked organic polymeric porous particles have a crosslinked organic solid phase and discrete pores dispersed within the crosslinked solid phase which pores are isolated from each other. These porous particles are prepared using one or more water-in-oil emulsions containing a polyfunctional reactive compound, a reagent that causes crosslinking, optionally an ethylenically unsaturated polymerizable monomer, and optionally an organic solvent, and can include various marker materials.

27 Claims, No Drawings

PREPARATION OF CROSSLINKED ORGANIC POROUS PARTICLES RELATED APPLICATIONS

RELATED APPLICATIONS

Reference is made to copending and commonly assigned U.S. Ser. No. 13/192,521 (published as 2013/0029155), filed on Jul. 28, 2011 by Mridula Nair.

Reference is made to copending and commonly assigned U.S. Ser. No. 13/192,544 (published as 2013/0029128), filed on Jul. 28, 2011 by Nair and Jones.

Reference is made to copending and commonly assigned U.S. Ser. No. 13/192,531 (published as 2013/0029102), filed on Jul. 28, 2011 by Landry-Coltrain and Nair.

Reference is made to copending and commonly assigned U.S. Ser. No. 13/192,533 (published as 2013/0029103), filed on Jul. 28, 2011 by Landry-Coltrain and Nair.

FIELD OF THE INVENTION

This invention relates to a method for preparing crosslinked organic porous particles having at least two discrete pores within a solid crosslinked organic polymer phase. The method includes the formation of an oil-in-water-in-oil emulsion. The crosslinked organic porous particles can be used in various articles including imaging elements.

BACKGROUND OF THE INVENTION

Porous polymeric particles have been prepared and used for many different purposes. For example, porous particles have been described for use in chromatographic columns, ion exchange and adsorption resins, drug delivery devices, cosmetic formulations, papers, and paints. The methods for generating pores in polymeric particles are well known in the field of polymer science. However, each particular porous particle often requires unique methods for their manufacture. Some methods of manufacture produce large particles without any control of the pore size while other manufacturing methods control the pore size without controlling the overall particle size and particle size distribution.

U.S. Pat. No. 3,957,741 (Rembaum et al.) describes crosslinked acrylate porous polymer particles having an average size less than 2 μm and various functional groups incorporated in the polymer.

U.S. Pat. No. 4,775,699 (Cozens) describes skinless porous polyvinyl chloride (PVC) particles having greater than 20% of the surface area made up of PVC and a particle size greater than 70 μm.

U.S. Pat. No. 6,780,942 (Leon et al.) describes porous particles prepared from various polyesters, which particles have pores in the outer surfaces.

In the publication by C. M. Cheng, J. W. Vanderhoff, and M. S. El-Aasser, *J. Polym. Sci.: Part A, Polymer Chemistry*, Vol. 30, pp. 245-256, 1992, the authors described porous particles having a pore size less than 100 nm and a particle size of 10 μm that are swellable in organic solvents.

Marker material can be included in porous particles so that the particles can be detected for a specific purpose. For example, U.S. Patent Application Publications 2008/0176157 (Nair et al.) and 2010/0021838 (Putnam et al.) and U.S. Pat. No. 7,754,409 (Nair et al.) describe porous particles and a method for their manufacture, which porous particles are designed to be toner particles for use in electrophotography. Such porous particles typically contain a colorant such as carbon black or another pigment to provide desired black-and-white or color electrophotographic images. Such porous particles ("toners") can be prepared using a multiple emulsion process in combination with a suspension process (such as "evaporative limited coalescence", ELC) in a reproducible manner and with a narrow particle size distribution.

Still another important use of polymeric particles is as a means for marking documents, clothing, or labels as a "security" tag. For example, U.S. Pat. No. 5,385,803 (Duff et al.) describes a process of authentication of documents using an electrophotographic process and core-shell toner particles containing an infrared emitting component and a detection step. U.S. Patent Application Publication 2003/0002029 (Dukler et al.) describes a method for labeling documents for authentication using a toner particle containing two or more mixed compounds having a characteristic detectable signal.

Product counterfeiting occurs in artworks, CD's, DVD's, computer software recorded on various media, perfumes, designer clothes, handbags, luggage, automobile and airplane parts, securities (for example stock certificates), identification cards (for example, drivers' licenses, passports, visas, and green cards), credit and debit cards, smart cards, and pharmaceuticals. The application of a security marker or taggant to an object or product for authenticating the origin or intended market is known in the art. Security markers can be incorporated into components that make up the object or product, or they can be incorporated into papers, inks, or varnishes that are applied to the object or product, or they can be incorporated into labels affixed to the object, product, or packaging there for. The presence of the security marker can be used to verify the authenticity of the origin of the object using suitable detection means that is specific to the security marker.

Some systems used for detecting the security markers are often known as "forensic" systems because they tend to require sophisticated equipment (for example high power microscopes) in a laboratory analysis. Other detection systems are designed for "field" use and are known as "covert" systems as they can be used outside the laboratory with specially designed equipment for the specific security markers being detected.

Some security markers can be dispersed within a carrier varnish and are referred to as particle-based or pigment-based markers. Such markers remain intact in the varnish and will appear as particles when examined microscopically. Other security markers are dissolvable in an ink or varnish and distributed in the carrier on a molecular level. These markers are not readily detected with a microscope and require more sophisticated detection equipment.

A means for detecting a population of microparticles is described in U.S. Pat. No. 5,450,190 (Schwartz et al.). Groups of microparticles of specific sizes and fluorescent properties or colors are mixed with toner particles and the resulting mixture is used in laser printer cartridges or photocopy machines to provide detectable images.

Particles having two or more different light emitting species can also be printed onto various substrates using various printing means, as described in WO 2007/051035 (Haushalter).

Toner particles having a luminescent material that includes quantum dots are described in EP 2,025,525 (Wosnick et al.) and can be used to form detectable markings on substrates. These toner particles can also include colorants or other detectable components.

Copending and commonly assigned U.S. Ser. No. 12/984,030 that was filed by Nair, Jennings, Jones, and Sedita, Ser. No. 12/984,044 that was filed by Nair, Jones, and Kapp, and Ser. No. 12/984,055 that was filed by Nair, Jennings, Jones, Sedita, and Olm, all on Jan. 4, 2011, describe porous particles that contain two or more different markers in discrete pores and various uses and methods of preparation. Such porous particles have various utilities including authentication, security (anti-counterfeiting), and electrophotographic purposes as described above.

While the noted porous particles represent an important advance in the art, there is a desire for improved porous particles that have increased resistance to organic solvents, high temperatures, and pressure.

SUMMARY OF THE INVENTION

The present invention provides a method for preparing a crosslinked organic porous particle comprising:

providing a first water-in-oil emulsion comprising a first pore stabilizing hydrocolloid in a first aqueous phase that is dispersed in a first oil phase, which first oil phase comprises a first polyfunctional reactive compound, a first reagent that causes crosslinking, optionally at least one first ethylenically unsaturated polymerizable monomer, and optionally a first organic solvent, and optionally providing a second water-in-oil emulsion comprising a second pore stabilizing hydrocolloid in a second aqueous phase that is dispersed in a second oil phase, which second oil phase comprises a second polyfunctional reactive compound, a second reagent that causes crosslinking, optionally at least one ethylenically unsaturated polymerizable monomer, and optionally a second organic solvent, optionally combining the first and second water-in-oil emulsions to form a third water-in-oil emulsion containing a mixture of the first and second oil phases and distinct droplets of the first and second aqueous phases, dispersing either the first water-in-oil emulsion or the third water-in-oil emulsion in a third aqueous phase containing a surface stabilizing agent to form a water-in-oil-in-water emulsion containing droplets of either the first water-in-oil emulsion or droplets of the third water-in-oil emulsion, which third water-in-oil emulsion droplets contain the distinct droplets of the first and second aqueous phases, and polymerizing the polyfunctional reactive compounds and optionally the ethylenically unsaturated polymerizable monomers to form a precursor crosslinked organic porous particle having a crosslinked organic solid phase including an external particle surface, and discrete pores, optionally first and second discrete pores, being isolated from each other and dispersed within the crosslinked organic solid phase, removing, if present, the first and second organic solvents to produce an aqueous suspension of the precursor crosslinked organic porous particle, and isolating the precursor crosslinked organic porous particle to provide a crosslinked organic porous particle.

This method can further comprise:

combining one or more additional water-in-oil emulsions (beyond the first and second water-in-oil emulsions), each comprising a pore stabilizing hydrocolloid in one or more additional aqueous phases that are dispersed in one or more additional oil phases each, and each oil phase containing a polyfunctional reactive compound, a reagent that causes crosslinking, optionally an ethylenically unsaturated polymerizable monomer, and optionally an organic solvent, with the first and second water-in-oil emulsions so that the third water-in-oil emulsion contains distinct droplets of the first, second, and the one or more additional aqueous phases.

If there are two or more marker materials in discrete pores, these detectably different marker materials are isolated from each other in different sets of discrete pores to provide a unique signature that is different from a signature that is obtained by mere mixing of the marker materials in the same domain (for example, in the same pores). Such crosslinked organic porous particles can be used in unique applications where different marker materials are needed for detection, authentication, or other purposes. Alternatively, mixtures of multiple types of crosslinked organic porous particles can be designed in which each type of crosslinked organic porous particle can have two or more detectably different marker materials that can additionally be manipulated by desired stimuli if desired.

The present invention provides a number of advantages. For example, it provides crosslinked organic porous particles that can be designed to have one or more detectably different marker materials within the same crosslinked organic porous particle. There is no need to have marker materials or reagents on the external particle surface. Nor is there a need to have open pores on the external particle surface for diffusion of materials into and out of the crosslinked organic porous particles.

Because the organic porous particles are crosslinked in the solid organic polymeric phase, they are much more resistant to high temperatures, pressures, various organic solvents and monomers that can be present in lacquers, varnishes, coating solvents, and melt processing temperature used to prepare imaging elements such as flexographic printing precursors. This crosslinked property increases the number of uses for the organic porous particles compared to non-crosslinked organic porous particles. In addition, the crosslinked organic porous particles have limited swellability in organic solvents such as propyl acetate as described below.

Such crosslinked organic porous particles can be prepared using unique methods using multiple water-in-oil emulsions. The crosslinked organic porous polymer particle size, size distribution, pore sizes, and types of marker materials can be controlled by the amount and type of "porogen" used to create the pores, the fraction of the first or second water phase relative to the oil phase, the relative quantity and type of polyfunctional reactive compound used, the relative quantity and type of solvents, the type and amounts of stabilizers and emulsifiers, and the type of shear that is used in dispersing one or more phases into the crosslinked polymer solid phase, and the amount of water-in-oil emulsion in the third water phase used to form the multiple emulsion. It is also possible to make crosslinked organic porous particles that are either spherical or less than spherical for various advantages.

In the method of preparing the crosslinked organic porous particles, one or more polyfunctional reactive compounds that can act as crosslinking agents are used to prepare the crosslinked solid polymer phase. Polyfunctional reactive compounds can be polyunsaturated compounds including both prepolymers and monomers capable of chain growth polymerization with reagents that cause crosslinking such as azo compounds or peroxides that are free radical initiators, and can also be reactive polymers such as those with carboxylic acid groups that are capable of step growth reactions with reagents that cause crosslinking such as polyfunctional aziridines or polyfunctional glycidyl compounds.

DETAILED DESCRIPTION OF THE INVENTION

As noted above, the crosslinked organic porous particles prepared using this invention can have various uses including but not limited to use in, chromatographic columns, ion exchange and adsorption resins, drug delivery devices, cosmetic formulations, pharmaceuticals, papers, fabrics, fibers, paints, inks, adhesives, electrophotographic toners, and security systems for detection of counterfeits, document authentication, and labeling of consumer goods (such as designer clothes, handbags, perfumes, and cosmetics). They can also be used in paper and plastic cards, for example driver's licenses, passports, and other identification cards. Moreover, the crosslinked organic porous particles can be incorporated into packaging and packaging components such as labels, tape, staples, foils, plastics, paperboard, and cardboard packing The crosslinked organic porous particles can also be included in varnishes (colored or colorless) and other coating compositions, polymeric films and fibers, and formed polymer, glass, and ceramic articles including ceramic substrates, bottles, and bottle caps. In some embodiments, the crosslinked organic porous particles can be melt-compounded or otherwise incorporated into a plastic and become an integral part of a packaging material.

The crosslinked organic porous particles also can be used in laser-engraveable flexographic relief-forming layers to enhance laser ablation rates in flexographic printing precursors. Such precursors are described in copending and commonly assigned U.S. Ser. Nos. 13/192,531 (published as 2013/0029102) and 13/192,533 (published as 2013/0029103) by Landry-Coltrain and Nair, as noted above.

The crosslinked organic porous particles are generally prepared, as described below, using multiple water-in-oil emulsions in combination with an aqueous suspension process, such as in the ELC process. One or more water-in-oil emulsions can be originally prepared and used to provide two or more discrete pores in the crosslinked organic porous particles.

The terms "crosslinked organic porous particle" and "crosslinked organic porous particles" are used herein, unless otherwise indicated, to refer to materials prepared according to the present invention. The crosslinked organic porous particles comprise a crosslinked solid (organic polymer) phase having an external particle surface and discrete pores (an least first and second different discrete types of pores as defined below) dispersed within the crosslinked organic solid phase and one or more marker materials, such as first and second marker materials that are exclusively within the first and second discrete pores, respectively.

The term "crosslinked" refers to the instance when the components of a composition or material are linked together by chemical bonds that link one polymer chain to another and involve joining together two or more polymeric molecules with bonds that are strong. These bonds can be covalent or ionic in nature although irreversible covalent bonds are best.

In many embodiments, the crosslinked organic solid phase of the crosslinked organic porous particles has the same composition. That is, the crosslinked organic solid phase is uniform in composition including any additives that are distributed within the crosslinked polymer binder. In addition, if mixtures of organic polymers are present in the crosslinked organic solid phase, those organic polymeric mixtures are dispersed uniformly throughout the porous particles.

Unless otherwise indicated herein, when used to define various components, chemicals, or materials, the articles "a", "an", and "the" refer to one or more (plurality) of those components, chemicals, or materials.

The terms "detectably different" or "detectably distinct" refer to different marker materials (or different mixtures of marker materials described below) being detectable from each other using suitable detection means.

The term "porogen" refers to a pore forming agent used to make the crosslinked organic porous particles. In this invention, a porogen can be the aqueous phase of the water-in-oil emulsions (that is the first and second aqueous phases), the pore stabilizing hydrocolloid, and any other additive in the aqueous phase that can modulate the porosity of the crosslinked organic porous particles.

As used in this disclosure, the term "isolated from each other" refers to the first and second marker materials being in different (distinct) pores. In other words, the first marker material is only in certain (first) pores and the second marker material is present only in different (second) pores. Each of these sets of pores can include other marker materials or materials that do not behave as marker materials as long as the first and second marker materials are purposely not located within the same pores. Another way of defining this feature is that the first marker materials are in the first discrete pores exclusively and the second marker materials are in the second discrete pores exclusively.

The terms "first discrete pore" and "second discrete pore" refer to different isolated pores in the porous particle that can contain different marker materials. First and second discrete pores can refer to distinct individual pores, or in most embodiments, they refer to distinct sets of pores. Each set of pores includes a plurality of pores, which pores are isolated from each other, and the pores of each set of pores are isolated from all other pores of the other sets of pores in the crosslinked organic porous particle. The first discrete pores can be empty or comprise a first marker material and the second discrete pores can contain a second marker material, and any additional discrete pores (beyond the first and second discrete pores) can optionally contain still a different marker material. The word "discrete" is also used to define different droplets of the first and second aqueous phases when they are suspended in the oil phase (described below).

The size of the crosslinked organic porous particle, the formulation, and manufacturing conditions are the primary controlling factors for pore size. However, generally the discrete pores have an average size of at least 100 nm (0.1 µm) and up to and including 4000 nm (4 µm), or more likely at least 100 nm (0.1 µm) and up to and including 2000 nm (2 µm). The discrete pores in the crosslinked organic porous particles (for example, the first and second discrete pores) can have the same or different average sizes. Pore size can be determined by analyzing Scanning Electron Microscopy (SEM) images of fractured crosslinked organic porous particles using a commercial statistical analysis software package to study the distribution of the pores within the crosslinked organic porous particles, or by manually measuring the pore diameters using the scale in the SEM images. For example, the "average" pore size can be determined by calculating the average diameter of 20 measured pores.

The crosslinked organic porous particles generally have a mode particle size of at least 3 µm and up to and including 100 µm, or typically at least 5 µm and up to and including 70 µm, or up to and including 50 µm, with this mode particle size being measured by, for example, automated image analysis and flow cytometry using any suitable equipment designed for this purpose. The mode particle size represents the most frequently occurring diameter for spherical crosslinked organic porous particles and the most frequently occurring largest diameter for the non-spherical porous particles in a particle size distribution histogram.

The crosslinked organic porous particles of this invention can also have small colloidal inorganic particles on the external particle surfaces. These colloidal inorganic particles can be interspersed on the external particle surfaces or they can be arranged in a pattern or entirely cover the external particle surfaces in a layer. Such colloidal inorganic particles can be composed of, for example, colloidal silica, colloidal alumina, colloidal titania, clay particles, or mixtures thereof. These colloidal inorganic particles can be individual particles, or aggregates of particles, ranging in particle or aggregate size of at least 5 nm and up to and including 2 µm.

In general, the crosslinked organic porous particles have porosity of at least 1% and up to and including 80%, or more likely at least 1% and up to and including 50%, or typically at least 10% and up to an including 30% to improve visualization of the marker particles in the crosslinked organic porous particles, all based on the total crosslinked organic porous particle volume. Porosity can be measured by the mercury intrusion technique or a time-of-flight method.

The discrete pores (such as first and second discrete pores) can also comprise pore stabilizing hydrocolloids that are described below. If both the first and second discrete pores are present, they can have the same or different stabilizing hydrocolloids. In most instances, the same pore stabilizing hydrocolloid is used throughout the crosslinked organic porous particles.

The crosslinked organic porous particles can be spherical or non-spherical depending upon the desired use. Non-spherical crosslinked organic porous particles can be advantageous for improved detection of the marker materials. The shape of crosslinked organic porous particles can be characterized by an "aspect ratio" (AR) that is defined as the ratio of the largest perpendicular length to the longest length of the particle. These lengths can be determined for example by optical measurements using a commercial particle shape analyzer such as the Sysmex FPIA-3000 (Malvern Instruments). For example, crosslinked organic porous particles that are considered "spherical" for this invention can have an aspect ratio of at least 0.9 and up to and including 1. For the non-spherical crosslinked organic porous particles of this invention, the aspect ratio can be as low as 0.1 and up to and including 0.95, and in some embodiments, the aspect ratio can be less than 0.95 and down to and including 0.4.

As described above, the crosslinked organic porous particles can include two or more marker materials that are detectably different. For convenience, when two detectably different marker materials are included within a crosslinked organic porous particle, they are labeled "first" and "second" marker materials to distinguish them. If additional detectably different marker materials are present in the same or different crosslinked organic porous particles, they are labeled, "third", "fourth", "fifth", and so forth, marker materials.

As defined herein, the first marker material can be present in a first discrete pore, a second marker material can be present in a second discrete pore, and additional marker materials (besides the first and second marker materials) can be present in additional discrete pores (besides the first and second discrete pores) of the crosslinked organic porous particle. These additional discrete pores can have an additional detectably different marker material.

In some embodiments, either the first or second discrete pores contain a marker material but the other set of discrete pores are "empty" (no marker material).

In some other embodiments, the crosslinked organic porous particles can have three or four additional discrete pores and each of these sets of discrete pores has a detectably different marker material wherein at least two of the detectably different marker materials in the three or four additional sets of discrete pores are detectably different from each other. Each of these markers in the three or four additional discrete pores is generally detectably different from all of the other marker materials in the crosslinked organic porous particle (that is, different from the first and second marker materials).

In still other embodiments, the crosslinked organic porous particles can have three or four additional discrete pores (beyond the first and second discrete pores) and they can have at least one more marker material than there are discrete sets of pores, so that at least one set of discrete pore has two or more (multiple) marker materials.

The detectably different marker materials can be different colored dyes or pigments (or colorants), or metallic pigments, that are generally not water soluble. Such colorants can include but are not limited to, those described in U.S. Reissue Pat. No. 31,072 (Jadwin et al.) and in U.S. Pat. No. 4,160,644 (Ryan), and U.S. Pat. No. 4,416,965 (Sandhu et al.), U.S. Pat. No. 4,414,152 (Santilli et al.), such as carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1, and C.I. Pigment Blue 15:3. Other useful colorants are described in U.S. Pat. No. 5,385,803 (Duff et al.) and EP 2,025,525 (Wosnick et al.) that are incorporated herein by reference. The marker materials can vary in water solubility although most have little water-solubility. Each marker material can include mixtures of colorants as long as the mixtures of marker materials in the crosslinked organic porous particle are detectably different. Thus, the first and second marker materials can be mixtures of marker materials as long as the mixtures are detectably different.

Other classes of marker materials useful in the practice of this invention include but are not limited to, different fluorescing materials, radioisotopes, particles of metals and metal-containing compounds (such as metal oxides, metal sulfides, and metal oxyhydroxides) having different magnetic moments, luminescing compounds, as well as bioactive materials. Certain reactive chemicals can be used as markers and kept separate in discrete pores until their reaction is needed. Examples of such reactive chemicals include acids and bases, and isocyanates and amines.

Examples of useful fluorescing marker materials include but are not limited to, compounds that absorb radiation (excite) in the UV and visible regions of the electromagnetic spectrum but then emit or fluoresce in the infrared or visible region of the electromagnetic spectrum. Other useful fluorescing marker materials absorb radiation (excite) in the infrared region and also fluoresce in the infrared region. Still other fluorescing marker materials absorb (excite) in the infrared region and fluoresce in the visible region. Fluorescent light activated dyes can be invisible to or exhibit one color under ambient light conditions and a second color under fluorescent light conditions. Fluorescent dyes are known to the person skilled in the art. Examples of such compound include but are not limited to, coumarins, perylenes, naphthalimides, cyanines including metal phthalocyanines and metal naphthocyanines, xanthenes, oxazines, anthracene, naphthacene, anthraquinone, and thiazine dyes and derivatives thereof so as to make them water-soluble or water-dispersible.

Examples of useful emissive inorganic marker materials include but are not limited to, $CaWO_4:Eu$; $CaMoO_4:Mn,Eu$; $BaFBr:Eu$; $Y_2O_2S:Tb$; $Y_2O_2S:Er,Yb$; $Y_2O_2S:Er$; $Y_2O_2S:Eu$; $Y_2O_3:Eu$; $Y_2O_3S:Eu+Fe_2O_3$; $Gd_2O_2S:Tb$; $Gd_2O_2S:Eu$; $Gd_2O_2S:Nd$; $Gd_2O_2S:Yb,Nd$; $Gd_2O_2S:Yb,Tm$; $Gd_2O_2S:Yb,Tb$; $Gd_2O_2S:Yb,Eu$; $LaOF:Eu$; $La_2O_2S:Eu$; $La_2O_2S:Eu,Tb$; $La_2O_2S:Tb$; $BaMgAl_{16}O_{27}:Eu$; $Y_2SiO_5:Tb,Ce$; $Y_3Al_5O_{12}:Ce$; $Y_3Al_{2.5}Ga_{2.5}O_{12}:Ce$; $YVO_4:Nd$; $YVO_4:Eu$; $Sr_5(PO_4)_3Cl:Eu$; $CaS:Eu$; $ZnS:Ag$; $ZnSiO_4:Mn$; $CaSiO_3:Mn$; $ZnS:Bi$; $(Ca,Sr)S:Bi$; $(Zn,Mg)F_2:Mn$; $CaWO_4$; $CaMoO_4$; $ZnO:Zn$; $ZnO:Bi$; $TiO_2$, and $KMgF_3:Mn$.

Visible light emitting compounds that are excited by exposure to UV radiation can be used including rare earth emitting compounds that are described in numerous publications including WO2007/051035 (Haushalter) that is incorporated herein by reference.

Examples of useful radioisotope marker materials include but are not limited to $^{32}$P, $^{3}$H, $^{14}$C, $^{41}$Ca, $^{57}$Co and $^{59}$Fe.

Examples of useful metal and metal-containing marker materials with different magnetic moments include but are not limited to, particles of iron, nickel, cobalt, and gadolinium, as well as particles of metal oxides, metal sulfides, metal oxysulfides, and metal oxyhydroxides. Other metal-containing compounds that would be useful as marker materials would be readily apparent to a skilled artisan. While many metal marker materials are insoluble in water or organic solvents, other metal marker materials are colloidal or suspendible materials in water or organic solvents.

It is particularly useful in some embodiments that the crosslinked organic porous particles comprise a radiation absorber in one or more of the sets of discrete pores, and particularly useful radiation absorbers are infrared radiation absorbers or ultraviolet radiation absorbers. Such embodiments can be useful in flexographic laser-ablatable layers that can be used in flexographic printing precursors, or other relief image-forming elements.

Examples of infrared (IR) radiation absorbers include compounds that emit infrared radiation having a wavelength of at least 700 nm and up to and including 1500 nm when irradiated with light having a shorter wavelength. Such compounds include but are not limited to, metal phthalocyanines, vanadyl phthalocyanines, copper phthalocyanines, metal free phthalocyanines, azines dyes, chlorophylls, and laser dyes. Various carbon blacks (conductive or non-conductive carbon blacks) are also useful as IR absorbers.

Luminescing compounds that have the capability of being illuminated upon exposure to activating radiation include those described in EP 2,025,525 (noted above).

Examples of chemicals that can be used as marker materials and can then react when mixed include but are not limited to, isocyanates, amines, epoxies, carboxylic acids, hydroxyl compounds, silanes, silica, alumina and other such sols.

The various marker materials (such as the first and second marker materials) can be present, independently, in an amount of at least 0.001 weight % and up to and including 35 weight %, or at least 0.001 weight % and up to and including 25 weight %, all based on total crosslinked organic porous particle weight. A skilled worker would understand that the various types of marker materials can be present in different amounts, depending for example on the amounts needed for detectability or the relative amounts of the marker materials needed in a specific crosslinked organic porous particle.

In some embodiments, the amount of the first marker material in relation to the amount of the second marker material is at a 1:2 to 2:1 weight ratio.

If the crosslinked organic porous particles are to be used as toner particles in electrophotographic processes, the crosslinked organic porous particles can also include one or more release agents such as waxes and lubricants. Examples of useful release agents are provided for example in U.S. Patent Application Publication 2008/0176157 (Nair et al.) that is incorporated herein by reference. Such compounds can be present in an amount of at least 0.1 weight % and up to and including 20 weight % based on the crosslinked organic porous particle dry weight.

In addition, such crosslinked organic porous toner particles can also include one or more charge control agents (either negative or positive charge control agents). Examples of such compounds are also described in U.S. Patent Application Publication 2008/0176157 (noted above). They can be present in an amount of at least 0.1 weight % and up to and including 5 weight %, based on the crosslinked organic porous particle dry weight.

While in many embodiments, all of the pores in the crosslinked organic porous particles contain one or more marker materials, the crosslinked organic porous particles can also include additional discrete pores besides the first and second discrete pores, and some of these additional discrete pores can have a marker material different from the first and second marker materials. Alternatively, some of these additional discrete pores have no marker material (they are void or "empty" of marker materials). Additionally, in yet other embodiments, all of the pores have no marker material, or all contain the same marker material.

While the pores can be completely filled with the individual marker materials, it is also possible that only parts of the pores are filled with the marker materials. For example, marker materials can be disposed on the inner wall of the respective first or second discrete pores, thereby leaving a void (unoccupied volume) within the interior of the first and second discrete pores, respectively.

In the embodiments comprising mixtures of different crosslinked organic porous particles (for example, a mixture of first and second crosslinked organic porous particles) in which the crosslinked organic solid phases have the same or different polymer compositions.

In addition, the mixture of first and second crosslinked organic porous particles can include first, second, third, and fourth marker materials that are all different, or only three of the marker materials are different and two of the marker materials can be the same. Some discrete pores can contain multiple (two or more) marker materials.

In still other embodiments, the first and third marker materials are the same, and the second and fourth marker materials are different from all other marker materials.

The crosslinked organic porous particles or mixtures of different crosslinked organic porous particles can be provided as powders, or as aqueous suspensions (including water or water with water-miscible organic solvents such as alcohols). Such aqueous suspensions can also include surfactants or suspending agents to keep the crosslinked organic porous particles suspended. In addition, the crosslinked organic porous particles can be provided in organic solvent suspensions using for example, in one or more of methanol, ethanol, isopropanol, acetone, ethyl acetate, propyl acetate, cyclohexane, dodecane, and toluene as organic solvents or in organic varnishes or lacquers.

The other compositional features are described in the following description of methods for preparing the crosslinked organic porous particles. The polyfunctional reactive compounds, reagents that cause crosslinking, ethylenically unsaturated polymerizable monomers, organic solvents, and pore stabilizing hydrocolloids used to form the crosslinked organic polymer solid phase of the crosslinked organic porous particles are described below.

Methods of Preparing Crosslinked Organic Porous Particles

A method for making the crosslinked organic porous particles involves the formation of one or more (for example, first and second) water-in-oil emulsions. A first stable water-in-oil emulsion is formed, including a first aqueous phase that is dispersed in a first oil phase. This first oil phase comprises a first polyfunctional reactive compound, a first reagent that causes crosslinking, optionally at least one first ethylenically unsaturated polymerizable monomer, and optionally a first organic solvent. The first aqueous phase creates the first discrete pores in the resulting crosslinked organic porous particles. The first aqueous phase can also include a first pore stabilizing hydrocolloid and a first marker material. Thus, the first water-in-oil emulsion can comprise a first marker material that is eventually incorporated into the first discrete pores.

Useful polyfunctional reactive compounds, reagents that cause crosslinking, ethylenically unsaturated polymerizable monomers, and organic solvents are described below. They are used to form a crosslinked organic solid phase (polymer phase) in the crosslinked organic porous particles.

The method can optionally provide a second water-in-oil emulsion comprising a second aqueous phase comprising a second pore stabilizing hydrocolloid (and optionally, a second marker material) dispersed in a suitable second oil phase. This second oil phase comprises a second polyfunctional reactive compound, a second reagent that causes crosslinking, optionally at least one second ethylenically unsaturated polymerizable monomer, and optionally a second polymerization initiator, and optionally a second organic solvent. This second aqueous phase creates the second discrete pores in the resulting crosslinked organic porous particles. As described above, the second marker material is detectably different from the first marker material. Thus, the second water-in-oil emulsion can comprise a first second marker material that is eventually incorporated into the second discrete pores.

The first and second pore stabilizing hydrocolloids (described below) can be the same or different chemicals, or the same or different mixtures of chemicals. In most embodiments, they are the same chemicals. In addition, the first and second oil phases can comprise the same or different organic solvents (described below), or the same or different mixtures of organic solvents. In most embodiments, the first and second oil phases contain the same organic solvents. Further, the first and second polyfunctional reactive compounds or first and second ethylenically unsaturated monomers and first and second reagents that cause crosslinking used in preparing the first and second oil phases can be the same or different compounds, or mixtures of compounds, but in most embodiments, they are the same compounds in both oil phases.

Suitable pore stabilizing hydrocolloids for preparing all of the emulsions described herein include both naturally occurring and synthetic, water-soluble or water-swellable polymers selected from the group consisting of cellulose derivatives [such for example, carboxymethyl cellulose (CMC) that is also referred to as sodium carboxymethyl cellulose], gelatin (for example, alkali-treated gelatin such as cattle bone or hide gelatin, or acid treated gelatin such as pigskin gelatin), gelatin derivatives (for example, acetylated gelatin and phthalated gelatin), proteins and protein derivatives, hydrophilic synthetic polymers [such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, and methacrylamide copolymers], water soluble microgels, polyelectrolytes [such as a polystyrene sulfonate, poly(2-acrylamido-2-methylpropanesulfonate), and a polyphosphate], and mixtures of any of these classes of materials.

In order to stabilize the initial water-in-oil emulsions so that they can be held without ripening or coalescence, it is desired that the pore stabilizing hydrocolloids in the aqueous phase have a higher osmotic pressure than that of the first and second oil phases depending on the solubility of water in the oil. This reduces the diffusion of water into the oil phases from the aqueous phases and thus the ripening caused by migration of water between the water droplets. One can achieve a higher osmotic pressure in the aqueous phase either by increasing the concentration of the pore stabilizing hydrocolloid or by increasing the charge on the pore stabilizing hydrocolloid (the counter-ions of the dissociated charges on the pore stabilizing hydrocolloid increase its osmotic pressure). It can be advantageous to have weak base or weak acid moieties in the pore stabilizing hydrocolloids that allow for their osmotic pressures to be controlled by changing the pH. Such pore stabilizing hydrocolloids are considered "weakly dissociating hydrocolloids". For these weakly dissociating hydrocolloids, the osmotic pressure can be increased by buffering the pH to favor dissociation, or by simply adding a base (or acid) to change the pH of the aqueous phase to favor dissociation. One example of such a weakly dissociating hydrocolloid is CMC that has a pH sensitive dissociation (the carboxylate is a weak acid moiety). For CMC, the osmotic pressure can be increased by buffering the pH, for example using a pH 6-8 buffer, or by simply adding a base to raise the pH of the aqueous phase to favor dissociation. For aqueous phases containing CMC the osmotic pressure increases rapidly as the pH is increased from 4-8.

Other synthetic polyelectrolyte hydrocolloids such as polystyrene sulfonate (PSS), poly(2-acrylamido-2-methylpropanesulfonate) (PAMS), and polyphosphates are also useful pore stabilizing hydrocolloids.

For example, the first and second pore stabilizing hydrocolloids are the same or different and independently selected from the group consisting of carboxymethyl cellulose (CMC), a gelatin, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

The pore stabilizing hydrocolloids are soluble in water, have no negative impact on multiple emulsification processes, and have no negative impact on melt rheology of the resulting crosslinked organic porous particles that, for example, can be used as electrophotographic toners. The pore stabilizing compounds can be optionally crosslinked to minimize migration of these compounds to the particle outer surface, which migration can adversely affect various desired properties such as triboelectrification of crosslinked organic porous particles designed to be used as electrophotographic toners. The amount of the first and second pore stabilizing hydrocolloids used to prepare the first and second emulsions (and any additional emulsions) will depend on the amount of porosity and size of pores desired and the molecular weight and charge of the pore stabilizing hydrocolloid that is chosen. For example, the first and second pore stabilizing hydrocolloids can be different in the first and second aqueous phases, resulting in crosslinked organic porous particles having first discrete pores that are different in size from the second discrete pores. CMC is particularly useful as a pore stabilizing hydrocolloid in both first and second water-in-oil emulsions in an amount of at least 0.5 weight % and up to and including 20 weight %, or at least 1 weight % and up to and including 10 weight %, based on the total weight of first and second aqueous phases used in each emulsion. In some embodiments, the concentrations of the first and second pore stabilizing hydrocolloids are different in the first and second aqueous phases, resulting in a crosslinked organic porous particle having first discrete pores that are different in size from the second discrete pores.

The first and second aqueous phases used in forming the first and second water-in-oil emulsions can additionally contain, if desired, salts to buffer the emulsions and optionally to control the osmotic pressure of the aqueous phases. When CMC is used, for example, the osmotic pressure can be increased by buffering using a pH 7 buffer. The first and second emulsions can also contain additional pore forming agents such as ammonium carbonate.

The first and second polyfunctional reactive compounds used in the first and second oil phases (or additional oil phases) are crosslinkable through chain growth or step growth polymerization reactions. The mechanistic pathways in each of these reactions are different. Chain-growth polymerization proceeds as a result of free-radicals or ions, whereas in step-growth polymerization, functional groups react with each other to increase the chain length or crosslink chains. This distinction was introduced by Paul Flory in 1953, as described in "Principles of Polymer Chemistry", Cornell University Press, 1953, p. 39.

Polyfunctional reactive compounds suitable for chain growth polymerization include polyfunctional polymerizable monomers and oligomers such as acrylate and methacrylate oligomers [the term "(meth)acrylate" used herein refers to acrylate and methacrylate] of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra (meth)acrylate, pentaerythritol tri(meth)acrylate, dipentaerythritol hexa(meth)acrylate, 1,6-hexanediol di(meth) acrylate, or neopentyl glycol di(meth)acrylate and mixtures thereof, and acrylate and methacrylate oligomers derived from low-molecular weight polyester resins, polyether resins, epoxy resins, polyurethane resins, alkyd resins, spiroacetal resins, epoxy acrylates, polybutadiene resins, and polythiol-polyene resins, and mixtures thereof that are capable of being dissolved in a suitable solvent or diluent monomers (described below) that are immiscible with the aqueous water phases and are substantially insoluble in water.

Additional polyfunctional reactive compounds suitable for chain growth polymerization also include polyfunctional monomers such as divinyl benzene, ethylene glycol dimethacrylate, trimethylolpropane triacrylate, hexanediol dimethacrylate, tripropylene glycol dimethacrylate, diethylene glycol dimethacrylate, pentaerythritol triacrylate, dipentaerythritol hexamethacrylate, and neopentyl glycol di(meth) acrylate, and mixtures thereof.

Useful polyfunctional reactive compounds suitable for chain growth polymerization include urethane acrylate and methacrylate oligomers that are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides unsaturation at the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, the polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for chain growth polymerization. Choices among isocyanates, polyols, and acrylate or methacrylate termination units allow considerable latitude in the development of urethane acrylate oligomers. Urethane acrylates like most oligomers as polybutadiene acrylate compounds are typically high in molecular weight and viscosity. These multifunctional reactive compounds contain multiple reactive sites. Their functionality can vary from 2 to 6. Particularly useful polyfunctional reactive compounds for chain growth polymerization include polyfunctional acrylic esters such as polybutadiene dimethacrylate and 1,6-hexanediol diacrylate, and polyhydric alcohols and their derivatives, such as mixtures of acrylate derivatives of pentaerythritol including pentaerythritol tetraacrylate and pentaerythritol triacrylate functionalized aliphatic urethanes derived from isophorone diisocyanate. Examples of useful urethane acrylate oligomers and polybutadiene dimethacrylate compounds are commercially available oligomers from Sartomer Company (Exton, Pa.), such as CN 968 and CN301.

Polyfunctional reactive compounds suitable for step growth polymerizations include polymers such as those derived from vinyl monomers and condensation monomers such as esters and mixtures thereof. Such polymers include those that have an acid or hydroxyl number greater than 2, but are not limited to polymers such as polyesters, polyurethanes, urethane acrylic copolymers, epoxy resins, silicone resins, polyamide resins, modified rosins, paraffins, and waxes. Still other useful polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. Such polymers can also be derived from vinyl monomers such as styrenic polymers, monoolefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone), all of the above copolymerized with monomers such as (meth)acrylic acid, maleic acid, hydroxyethyl (meth)acrylate and the like to result in polyfunctional reactive compounds such that they are capable of being crosslinked with a reagent that causes crosslinking, being dissolved in a suitable solvent or ethylenically unsaturated monomers (described below) that are immiscible with the aqueous water phases and are substantially insoluble in water.

Ethylenically unsaturated polymerizable monomers useful in this invention include monofunctional monomers, such as acrylate and methacrylate monomers, and vinyl monomers, for example, methyl methacrylate, butyl acrylate, styrene, vinyl pyrrolidone, and mixtures thereof. It is not outside the scope of this invention to use monoethylenically unsaturated oligomers in place of or in addition to the ethylenically unsaturated monomers described above.

Polyfunctional reactive compounds, crosslinkable through chain growth polymerization or step growth polymerization that can be used in any or all of the oil phases are described above.

When an oil phase contains one or more of the polyfunctional reactive compounds that are crosslinkable through chain growth polymerization reactions including ethylenically unsaturated polymerizable monomers described above, that oil phase also includes a suitable reagent that causes crosslinking that is typically a free radical initiator that provides free radicals useful for initiating and continuing free radical chain growth polymerization. Useful free radical initiators for chain growth polymerization reactions well known in the art and include such classes of compounds as azo compounds, peroxides, and other oil-soluble free radical initiators that are readily available from a number of commercial sources. A skilled worker would understand how much of a specific free radical initiator would be best for specific monomers. Typically, a free radical initiator is present in an amount of at least 1 weight % and up to and including 5 weight % based on the total weight of the polyfunctional reactive compound and the ethylenically unsaturated monomers that can be polymerized by chain growth polymerization. The free radical initiator can be activated by heat or light such as UV radiation. The temperature or wave length of light used depends on the half life of the initiator at the desired temperature or the absorption characteristics of the photoinitiator respectively.

When an oil phase contains one or more of the polyfunctional reactive compounds crosslinkable through step growth polymerization reactions monomers described above, that oil phase also includes a suitable reagent that causes crosslinking that is typically a reactive compound that provides appropriate functional groups for step growth polymerization. Useful step growth polymerization reactions are polyfunctional aziridines or polyfunctional glycidyl compounds. Examples of useful reagents that cause crosslinking through step growth polymerization include but are not limited to, CX-100, a polyfunctional aziridine from DSM Neo Resins, ERISYS GE240, a tetra glycidyl m-xylene diamine from CVC Thermoset Specialities, butanediol diglycidyl ether, 2,3-dihydroxydioxane, chromium potassium sulfate, and zinc ammonium carbonate.

Some embodiments include a mixture of first and second crosslinked organic porous particles, each type of crosslinked organic porous particle being prepared as described above. For example, in the mixture of crosslinked organic porous particles, the first, second, third, and fourth marker materials can be all different. Alternatively, the first and third marker materials are the same, and the second and fourth marker materials are different from all other marker materials. This mixture of crosslinked organic porous particles can be prepared and provided in powder form or in an aqueous or organic solvent suspension.

Any suitable organic solvent that will dissolve the polyfunctional reactive compound and the ethylenically unsaturated polymerizable monomers and that is also immiscible with water can be used to prepare the first and second emulsions (or additional emulsions). Such organic solvents include but are not limited to, methyl acetate, ethyl acetate, propyl acetate, chloromethane, dichloromethane, vinyl chloride, trichloromethane, carbon tetrachloride, ethylene chloride, trichloroethane, toluene, xylene, cyclohexanone, 2-nitropropane, dimethyl carbonate, and mixtures of two or more of these solvents. Ethyl acetate and propyl acetate are generally good solvents for many useful polymers while being sparingly soluble in water, and they are readily removed as described below by evaporation. In the case where the polyfunctional reactive compound is crosslinked using chain growth polymerization, the organic solvent if used, is removed prior to completion of the crosslinking reaction. It can be removed after the water-in-oil-in-water emulsion is formed and before the free radical initiator is activated by light or heat, or it can be removed after the chain growth polymerization is allowed to proceed partially or fully. The function of the solvent in all cases is not only to dissolve the multifunctional reactive compounds but also to provide a template for increasing porosity by accommodating increased weight fraction of the aqueous phases in the first and second emulsions.

Optionally, the organic solvents that will dissolve the polymers and that is immiscible with water can be a mixture of two or more water-immiscible solvents chosen from the list given above.

The first and second oil can also contain emulsifiers to stabilize the first and second water-in-oil emulsions. Such emulsifiers usually have a low HLB number. Useful emulsifiers for the water-in-oil emulsions include but are not limited to, sorbitan esters of fatty acids such as oleic acid and stearic acid, polyethylene oxide esters of fatty acids, Tetronic® 150R1 a tetrafunctional block copolymer with terminal secondary hydroxyl groups (available from BASF Corporation), and polyglycerol polyricinoleate, GRINDSTED® PGPR 90 (available from DANISCO®).

Depending upon the ultimate use of the crosslinked organic porous particles, the first and second emulsions can also include various additives, generally that are added to the polyfunctional reactive compound and the ethylenically unsaturated polymerizable monomers prior to their dissolution in the organic solvent, during dissolution, or after the dissolution step itself. Such additives can include but are not limited to, colorants, charge control agents, shape control agents, compatibilizers, wetting agents, surfactants, plasticizers, and release agents such as waxes and lubricants, that are not within the pores as marker materials. Combinations of these materials can also be used. At least one of the first and second aqueous phases can include a buffering salt, examples of which are readily known in the art.

The first and second emulsions (and any additional emulsions) used to prepare the crosslinked organic porous particles can be prepared by any known emulsifying technique and conditions using any type of mixing and shearing equipment. Such equipment includes but is not limited to, a batch mixer, planetary mixer, single or multiple screw extruder, dynamic or static mixer, colloid mill, high pressure homogenizer, sonicator, or a combination thereof. While any high shear type agitation device is useful, a particularly useful homogenizing device is the Microfluidizer® such as Model No. 110T produced by Microfluidics Manufacturing operating at >5000 psi (>351.5 kg/cm$^2$). In this device, the droplets of the first and second aqueous phases can be dispersed separately and reduced in size in the respective oil (organic) phases in a high flow agitation zone and, upon exiting this zone, the particle size of the dispersed aqueous phases is reduced to uniform sized dispersed droplets in each of the oil phases. The temperature of the process can be modified to achieve the optimum viscosity for emulsification of the droplets and to minimize evaporation of the oil phases.

Optionally, the first and second water-in-oil emulsions can be combined to form a third water-in-oil emulsion containing a mixture of the first and second oil phases and distinct droplets of the first and second aqueous phases. The first and second water-in-oil emulsions can be combined in any desirable weight ratio as long as at least one marker material is detectable. For example, in some embodiments, the weight ratio of the first water-in-oil emulsion to the second oil-in-water emulsion in the third water-in-oil emulsion can be from 1000:1 and to and including 0.01:1.

In some embodiments, a third oil phase (containing any of the organic solvents from the list of organic solvents described above) containing a third polyfunctional reactive compound (chosen from the list of polyfunctional reactive compounds described above) or ethylenically unsaturated polymerizable monomers and a reagent that causes crosslinking initiators (as described above) can be combined with the first and second water-in-oil emulsions. The third polyfunctional reactive compound can be the same or different from the first and second polyfunctional reactive compounds described above. The third oil phase containing the third polyfunctional reactive compound can be combined in this manner in any suitable amount in relation to the first and second water-in-oil emulsions, for example, but not limited to, a weight ratio of at least 100:1 and to and including 1:100. The addition of the third oil phase allows the manufacturer to use stock solutions of the first and second water-in-oil emulsions and to modify them as desired without having to make up fresh water-in-oil emulsions.

Either the first water-in-oil or the third water-in-oil emulsion is then dispersed in a third aqueous phase that can contain a surface stabilizing agent to form a water-in-oil-in-water emulsion containing droplets of either the first water-in-oil emulsion or the third water-in-oil emulsion, respectively. These third water-in-oil emulsion droplets contain the distinct droplets of the first and second aqueous phases. The third water-in-oil emulsion can be dispersed within a third aqueous phase in the presence of a colloidal silica stabilizing agent to form a water-in-oil-in-water emulsion, containing an aqueous suspension of oil droplets of the third water-in-oil emulsion, wherein the oil droplets contain discrete smaller droplets of the first aqueous phase, and second aqueous phase if present.

The resulting water-in-oil-in-water emulsion is subjected to shear or extensional mixing or similar flow processes, for example through a capillary orifice device to reduce the droplet size and achieve narrow size distribution droplets through the limited coalescence process. The pH of the third aqueous phase is generally between 4 and 7 when colloidal silica is used as the stabilizing agent.

The suspension of droplets of the first water-in-oil (and second water-in-oil emulsion if present) in the third aqueous phase, results in droplets of polyfunctional reactive compound, or optionally an ethylenically unsaturated polymerizable monomers and a reagent that causes crosslinking, dissolved in the oil containing the first aqueous phase (and second aqueous phase, if present) as distinct finer droplets within the bigger polymer droplets that upon solidification produce discrete porous domains in the resulting crosslinked organic porous particles containing the polymer(s) as a crosslinked organic solid phase.

Useful surface stabilizing agents for the water-in-oil-in-water emulsions include both water soluble polymers and small colloidal particles, but are not limited to, stabilizer polymers such as poly(vinyl pyrrolidone) and poly(vinyl alcohol), inorganic stabilizers such as clay particles, colloidal silica (for example LUDOX™ or NALCO™), or polymer latex particles as described in modified ELC process described in U.S. Pat. No. 4,833,060 (Nair et al.), U.S. Pat. No. 4,965,131 (Nair et al.), U.S. Pat. No. 2,934,530 (Ballast et al.), U.S. Pat. No. 3,615,972 (Morehouse et al.), U.S. Pat. No. 2,932,629 (Wiley), and U.S. Pat. No. 4,314,932 (Wakimoto et al.), the disclosures of which are hereby incorporated by reference. Any combinations of these surface stabilizing agents can also be used.

The actual amount of surface stabilizing agent used in the method depends on the size of the final crosslinked organic porous particles desired, which in turn depends upon the volume and weight ratios of the various phases used for making the multiple emulsions. While not intending to be limiting, the amount of surface stabilizing agent in either or both emulsions can be at least 0.1 weight % and up to and including 30 weight %, or typically at least 0.1 weight % and up to and including 10 weight %, based on the total weight of the water-in-oil-in-water emulsion and depending upon the surface activity of the stabilizer including, in the case of particulate stabilizers, the particle size of the surface stabilizing agent (for example, colloidal or fumed silica particles). When such particulate stabilizers are used, the amount can be at least 0.2 weight % and up to and including 5 weight %.

Where the water-in-oil-in-water emulsion is formed, shear or extensional mixing or flow process is controlled in order to minimize disruption of the distinct droplets of the first aqueous phase (and second aqueous phase, if present) in the oil phase(s). Droplet size reduction is achieved by homogenizing the final water-in-oil-in-water emulsion through a capillary orifice device, or other suitable flow geometry. The shear field used to create the droplets in the final water-in-oil-in-water emulsion can be created using standard shear geometries, such as an orifice plate or capillary. However, the flow field can also be generated using alternative geometries, such as packed beds of beads, or stacks or screens that impart an additional extensional component to the flow. It is well known in the literature that membrane-based emulsifiers can be used to generate multiple emulsions. The techniques allow the droplet size to be tailored across a wider range of sizes by adjusting the void volume or mesh size, and can be applied across a wide range of flow rates. The back pressure suitable for producing acceptable particle size and size distribution is at least 100 psi and up to and including 5000 psi (7 kg/cm$^2$ to 351.5 kg/cm$^2$), or typically at least 500 psi and up to and including 3000 psi (35.2 kg/cm$^2$ to 211 kg/cm$^2$). The flow rate is generally at least 1000 ml/min. and up to and including 6000 ml/min., particularly when a capillary orifice device is used.

The final size of the crosslinked organic porous particles and the final size of the pores of the crosslinked organic porous particles can be impacted by the osmotic mismatch between the osmotic pressure of the one or both of the first and second aqueous phases and the third aqueous phase. At each interface, the larger the osmotic pressure gradient present, the faster the diffusion rate where water will diffuse from the lower osmotic pressure phase to the higher osmotic pressure phase depending on the solubility and diffusion coefficient in the oil (organic) phase. If the osmotic pressure of the third aqueous phase is higher than the either or both of the first and second aqueous phases, then the water will migrate out of the pores of the crosslinked organic particle and reduce the porosity and pore size. In order to maximize porosity, one can tailor the osmotic pressures so that the osmotic pressure of the third aqueous phase is lower than the osmotic pressure of the first phase or both first and second aqueous phases. Thus, water will diffuse following the osmotic gradient from the third aqueous phase into the first aqueous phase (and second aqueous phase, if present) swelling the size of the distinct droplets of the first and second aqueous phases thereby increasing the final porosity and pore size. This osmotic shock is desirably created after the homogenization of the water-in-oil-in-water emulsion to minimize disruption of the distinct droplets of the aqueous phases.

If it is desirable to have small pores and maintain the initial small drop size formed in the making of the first and second emulsions, the osmotic pressure of both the interior and exterior aqueous phase can be matched, or have only a small osmotic pressure gradient. Depending on the osmotic pressure of each of the first and second aqueous phases and their values relative to the third aqueous phase, the resulting discrete pores can have different average sizes.

Optionally, additional water can be added to the water-in-oil-in-water emulsion before polymerization to increase the size of the pores by creating an osmotic pressure mismatch between the first and second aqueous phases as described above.

Once the water-in-oil-in-water emulsion has been formed, the polyfunctional reactive compounds and optionally ethylenically unsaturated polymerizable monomer(s) supplied from one or both of the first and second water-in-oil emulsions, are polymerized to form precursor crosslinked organic porous particles having a crosslinked organic solid phase including an external particle surface, and discrete pores, and optionally first and second discrete pores that are isolated from each other and dispersed within the crosslinked organic solid phase. This crosslinking can be instigated by the application of heat or polymerizing radiation (for example actinic or IR or UV radiation) to the water-in-oil-in-water emulsion as described earlier for initiating crosslinking by chain growth polymerization so that a polymerization initiator provides free radicals for monomer polymerization, crosslinking, and solidification. In the case of step growth polymerization, generally crosslinking is instigated with heat usually during solvent removal for solidification.

The first and second organic solvents, if present, are removed as described earlier to produce an aqueous suspension of precursor crosslinked organic porous particles containing discrete pores such as first and second pores that can contain suitable marker materials. The precursor crosslinked organic porous particles can then be subjected to suitable isolation and drying techniques to provide the desired crosslinked organic porous particles, including removing water from the pores. The details of this process depend upon the type of the crosslinking process, and the water solubility and boiling points of the organic solvents in the oil phases relative to the temperature of the drying process. Generally, however, organic solvents can be removed by evaporation using removal apparatus such as a rotary evaporator or a flash evaporator. The crosslinked organic porous particles can be isolated after removing the organic solvents by filtration or centrifugation, followed by drying for example in an oven at 40° C. that also removes any water remaining in the pores. Optionally, the crosslinked organic porous particles can be treated with alkali to remove any silica surface stabilizer particles.

The shape of the crosslinked organic porous particles can be modified if necessary for improved visualization of the marker materials using microscopic techniques and to control the electrostatic toner transfer and cleaning properties where such properties have been found to improve as the spherical nature (sphericity) of the crosslinked organic porous particles is reduced (for example, an aspect ratio of less than 0.95, or an aspect ratio of from 0.4 and up to and including 0.95). Crosslinked organic porous particles that are not perfectly spherical can be useful to improve the visualization of the marker materials in the pores. Thus, useful non-spherical crosslinked organic porous particles have an aspect ratio of less than 0.95 and typically less than 0.9 and as low as 0.1.

In the method used to prepare the crosslinked organic porous particles, additives (shape control agents) can be incorporated into the first or second aqueous phases, in the first or second oil (organic) phase or in the third aqueous phase to modify the shape, aspect ratio or morphology of the crosslinked organic porous particles. The shape control agents can be added after or prior to forming the water-in-oil-in-water emulsion. In either case, the interfacial tension at the oil and third water interface is modified before solvent is removed and crosslinking reactions are completed, resulting in a reduction in sphericity of the crosslinked organic porous particles. Some useful shape control agents are quaternary ammonium tetraphenylborate salts described in U.S. Patent Application Publication 2007/0298346 (Ezenyilimba et al.), metal salts described in U.S. Patent Application Publication 2008/0145780 (Yang et al.), carnauba waxes described in U.S. Pat. No. 5,283,151 (Santilli), SOLSPERSE® hyperdispersants as described in U.S. Pat. No. 5,968,702 (Ezenyilimba et al.), metal salts as described in U.S. Pat. No. 7,655,375 (Yang et al.), and zinc organic complexes as described in U.S. Pat. No. 7,662,535 (Yang et al.). All of these publications are incorporated herein by reference. The more desirable shape control agents are polyethyloxazoline, fatty acid modified polyesters such as EFKA® 6225 and EFKA® 6220 from Ciba BASF, and phosphate esters of alkoxylated phenols such as SynFac® 8337.

If the crosslinked organic porous particles are to be used as toner particles, they can also contain flow aids in the form of surface treatments that are typically in the form of inorganic oxides or polymeric powders with typical particle sizes of at least 5 nm and up to and including 1000 nm. With respect to the surface treatment agent also known as a spacing agent, the amount of the spacing agent on the crosslinked organic porous particles is an amount sufficient to permit the crosslinked porous toner particles to be stripped from carrier particles in a two component dry developer by the electrostatic forces associated with the charged image or by mechanical forces. Useful amounts of the spacing agent are at least 0.05% and up to and including 10% or typically at least 0.1% and up to and including 5%, based on the weight of the crosslinked organic porous toner particle.

It should be understood from the description for providing crosslinked organic porous particles having first and second discrete pores, that the method for making these particles can be modified or expanded to incorporate additional discrete pores. To accomplish this, for example, the method described herein can further comprise:

combining one or more additional water-in-oil emulsions, each comprising a pore stabilizing hydrocolloid in one or more additional aqueous phases that are dispersed in one or more additional oil phases each, and each oil phase containing a polyfunctional reactive compound, a reagent that causes crosslinking, optionally an ethylenically unsaturated polymerizable monomer, and optionally a polymerization initiator, with the first and second water-in-oil emulsions described above so that the third water-in-oil emulsion contains distinct droplets of the first, second, and the one or more additional aqueous phases.

In some embodiments of this method, at least one of the additional water-in-oil emulsions contains a marker material. Alternatively, at least one additional water-in-oil emulsion contains no marker materials. In still other embodiments, at least one of the first or second water-in-oil emulsions contains multiple marker materials.

The crosslinked organic porous particles are insoluble in propyl acetate for 24 hours at room temperature (from 20° C. to 25° C.) whereas the polyfunctional reactive compounds used to make the crosslinked organic porous particles are generally soluble in propyl acetate under the same conditions. In a particular embodiment, the crosslinking is achieved to such an extent that when the crosslinked organic porous particle is subjected to 200° C. and 1500 psi pressure (105.5 $kg_f/cm^2$) for 5 minutes, the crosslinked organic porous particle recovers at least 80%, and typically at least 95%, of its original volume (volume before being subjected to this test).

Articles and Methods of Labeling

The crosslinked organic porous particles can be incorporated into various articles. Such articles can be a fabric, label, film, fiber, paper sheet or plastic filmcard, paperstock, packaging component, or polymer, ceramic, or glass article. In addition, the article can comprise a coating composition (varnish or ink) comprising the one or more crosslinked organic porous particles. The article can be a document having the one or more crosslinked organic porous particles to provide authenticity. Alternatively, the article is a formed polymer or glass article that comprises one or more crosslinked organic porous particles.

In such articles, the first and second marker materials can be independently selected from the groups consisting of colored pigments or inks, fluorescing materials, radioisotopes, luminescing compounds, particles of metal or metal-containing compounds having a magnetic moment, and bioactive materials.

In some of the articles, the crosslinked organic porous particles further comprise additional discrete pores besides the first and second discrete pores. Such additional discrete pores can have no marker materials.

The first and second discrete pores can comprise pore stabilizing hydrocolloids that are the same or different and are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly (2-acrylamido-2-methylpropanesulfonate), and a polyphosphate.

The crosslinked organic porous particles can also be used in a method of labeling an article with detectable information comprising:

incorporating one or more crosslinked organic porous particles into a material, or applying one or more crosslinked organic porous particles to a substrate, each crosslinked organic porous particle comprising a crosslinked organic polymer that provides a crosslinked organic solid phase including an external particle surface and discrete pores that are isolated from each other and dispersed within the crosslinked organic solid phase, the discrete pores having an average size greater than or equal to 0.1 µm, wherein the mode particle size of the porous particles is at least 3 µm and up to and including 100 µm. In some embodiments, the crosslinked organic porous particles comprise first discrete pores comprising a first marker material, and second discrete pores comprising a second marker material, which first and second marker materials are detectably different.

In this method, the one or more crosslinked organic porous particles can be applied to the substrate in a varnish or ink, or they can be applied to the substrate in a paper or plastic label. Alternatively, the one or more organic crosslinked organic porous particles can be introduced into the material or applied to the substrate in a pattern. The substrate can be a fiber or fabric.

A system of detection comprises:

a detectable composition comprising one or more crosslinked organic porous particles wherein each crosslinked organic porous particle comprises a crosslinked organic polymer that provides a crosslinked organic solid phase including an external particle surface and discrete pores that are isolated from each other and dispersed within the crosslinked organic solid phase, the discrete pores having an average size greater than or equal to 0.1 µm, wherein the mode particle size of the crosslinked organic porous particles is at least 3 µm and up to and including 50 µm, and an instrument for detecting one or both of the first and second markers in the crosslinked organic porous particles.

The present invention provides at least the following embodiments and combinations thereof, but other combinations of features are considered to be within the present invention as a skilled artisan would appreciate from the teaching of this disclosure:

1. A method for preparing a crosslinked organic porous particle comprising:

providing a first water-in-oil emulsion comprising a first pore stabilizing hydrocolloid in a first aqueous phase that is dispersed in a first oil phase, which first oil phase comprises a first polyfunctional reactive compound, a first reagent that causes crosslinking, optionally at least one first ethylenically unsaturated polymerizable monomer, and optionally a first organic solvent, and optionally providing a second water-in-oil emulsion comprising a second pore stabilizing hydrocolloid in a second aqueous phase that is dispersed in a second oil phase, which second oil phase comprises a second polyfunctional reactive compound, a second reagent that causes crosslinking, optionally at least one ethylenically unsaturated polymerizable monomer, and optionally a second organic solvent, optionally combining the first and second water-in-oil emulsions to form a third water-in-oil emulsion containing a mixture of the first and second oil phases and distinct droplets of the first and second aqueous phases, dispersing either the first water-in-oil emulsion or the third water-in-oil emulsion in a third aqueous phase containing a surface stabilizing agent to form a water-in-oil-in-water emulsion containing droplets of either the first water-in-oil emulsion or droplets of the third water-in-oil emulsion, which third water-in-oil emulsion droplets contain the distinct droplets of the first and second aqueous phases, and polymerizing the polyfunctional reactive compounds and optionally the ethylenically unsaturated polymerizable monomers to form a precursor crosslinked organic porous particle having a crosslinked organic solid phase including an external particle surface, and discrete pores, optionally first and second discrete pores, being isolated from each other and dispersed within the crosslinked organic solid phase, removing, if present, the first and second organic solvents to produce an aqueous suspension of the precursor crosslinked organic porous particle, and isolating the precursor crosslinked organic porous particle to provide a crosslinked organic porous particle.

2. The method of embodiment 1 wherein the first water-in-oil emulsion further comprises a first marker material that is incorporated into the first discrete pores, and wherein the second water-in-oil emulsion further comprises a second marker material that is incorporated into the second discrete pores.

3. The method of embodiment 2 wherein at least one of the first and second marker materials is selected from the group consisting of colored pigments or dyes, fluorescing materials, radioisotopes, luminescing compounds, particles of metal and metal-containing compounds having magnetic moments, luminescing compounds, and bioactive materials.

4. The method of any of embodiments 1 to 3 wherein the first and second surface stabilizing agents are independently a poly(vinyl pyrrolidone), poly(vinyl alcohol), clay particles, colloidal silica, fumed silica, polymer latex particles, or any combination thereof.

5. The method of any of embodiments 1 to 4 wherein the first and second surface stabilizing agents are independently present in an amount of at least 0.1 weight % and up to an including 10 weight % of the water-in-oil-in-water emulsion.

6. The method of any of embodiments 1 to 5 wherein each of the first and second surface stabilizing agents is colloidal or fumed silica that is present in an amount of at least 0.2 weight % and up to and including 5 weight % of the water-in-oil-in-water emulsion.

7. The method of any of embodiments 1 to 6 wherein one or both of the first and second oil phases comprise a colorant, release agent, charge control agent, shape control agent, compatibilizer, wetting agent, surfactant, plasticizer, wax, or lubricant, or any combination of these materials.

8. The method of any of embodiments 1 to 7 wherein at least one of the first and second aqueous phases comprises a buffering salt.

9. The method of any of embodiments 1 to 8 further comprising drying the crosslinked organic porous particle.

10. The method of any of embodiments 1 to 9 wherein the first or second oil phases comprises an organic solvent that is selected from the group consisting of ethyl acetate, propyl acetate, chloromethane, dichloromethane, vinyl chloride, trichloromethane, carbon tetrachloride, ethylene chloride, trichloroethane, toluene, xylene, cyclohexanone, dimethyl carbonate, and 2-nitropropane, and a mixture of two or more of these solvents.

11. The method of any of embodiments 1 to 10 wherein after forming the water-in-oil-in-water emulsion and before polymerizing, adding water to the water-in-oil-water emulsion.

12. The method of any of embodiments 1 to 11 wherein the weight ratio of the first water-in-oil emulsion to the second water-in-oil emulsion combined in the third water-in-oil emulsion is from 1000:1 and up to and including 0.01:1.

13. The method of any of embodiments 1 to 12 comprising dispersing the third water-in-oil emulsion in the third aqueous phase using a capillary orifice device.

14. The method of embodiment 13 comprising dispersing the third water-in-oil emulsion in the third aqueous phase using a back pressure of at least 100 psi (7 kg/cm$^2$) and up to and including 5000 psi (351.5 kg/cm$^2$) using a flow rate of at least 1000 ml/min. and up to and including 6000 ml/min.

15. The method of any of embodiments 1 to 14 further comprising:

combining one or more additional water-in-oil emulsions, each comprising a pore stabilizing hydrocolloid in one or more additional aqueous phases that are dispersed in one or more additional oil phases each, and each oil phase containing a polyfunctional reactive compound, a reagent that causes crosslinking, optionally an ethylenically unsaturated polymerizable monomer, and optionally an organic solvent, with the first and second water-in-oil emulsions so that the third water-in-oil emulsion contains distinct droplets of the first, second, and the one or more additional aqueous phases.

16. The method of embodiment 15 wherein at least one of additional water-in-oil emulsions contains a marker material.

17. The method of embodiment 15 or 16 further comprising at least one additional water-in-oil emulsion that contains no marker materials.

18. The method of any of embodiments 1 to 17 wherein the first and second pore stabilizing hydrocolloids are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

19. The method of any of embodiments 1 to 18 wherein the first and second pore stabilizing hydrocolloids are different, resulting in a crosslinked organic porous particle having first discrete pores that are different in size from the second discrete pores.

20. The method of any of embodiments 1 to 19 wherein the concentrations of the first and second pore stabilizing hydrocolloids are different in the first and second aqueous phases, resulting in a crosslinked organic porous particle having first discrete pores that are different in size from the second discrete pores.

21. The method of any of embodiments 1 to 20 that provides a crosslinked organic porous particle having an aspect ratio of at least 0.95.

22. The method of any of embodiments 1 to 20 that provides a crosslinked organic porous particle having an aspect ratio of at least 0.1 and up to and including 0.95.

23. The method of any of embodiments 1 to 22 wherein at least one of the first and second oil phases contains a shape control agent.

24. The method of any of embodiments 1 to 23 wherein the third aqueous phase contains a shape control agent.

25. The method of any of embodiments 1 to 24 that provides a crosslinked organic porous particle having an aspect ratio of at least 0.4 and up to and including 0.95 by including a fatty acid modified polyester, polyethyloxazoline, or a phosphate ester of an alkoxylated phenol in the first, second, or third aqueous phase or in the first or second oil phase.

26. The method of any of embodiments 1 to 25 comprising polymerizing by the application of heat or polymerization radiation to the water-in-oil-in-water emulsion.

The following Examples are provided to illustrate the practice of this invention and are not meant to be limiting in any manner. In the following Examples:

The polyester resins, Kao E and Kao E-B were obtained from Kao Specialties Americas LLC, a part of Kao Corporation (Japan).

The monomers, styrene, methyl methacrylate, 2-ethylhexyl methacrylate and ethylene glycol dimethacrylate were obtained from Sigma Aldrich Co.

The prepolymers, CN968, an aliphatic urethane hexaacrylate oligomer and CN301, a mixture of polybutadiene dimethacrylate and 1,6-hexanediol diacrylate esters, were obtained from Sartomer USA, LLC.

Carboxy methylcellulose, MW 250K (CMC), was obtained from Acros Organics or from Ashland Aqualon as Aqualon 9M31F. These were interchangeably used.

The emulsifiers, Tetronic® 150 R1, a tetrafunctional block copolymer with terminal secondary hydroxyl groups, was obtained from BASF Corporation. Polyglyerol polyricinoleate, GRINDSTED® PGPR 90, was obtained from DANISCO®.

Nalco™ 1060 colloidal silica was obtained from Nalco Chemical Company as a 50 weight % aqueous dispersion.

Ludox® TM colloidal silica was obtained from W.R Grace and Co. as a 50 weight % aqueous dispersion.

EFKA 6225 and EFKA 6220, fatty acid modified polyesters, used as a shape control agents were obtained from Ciba Specialty Chemicals. The secondary shape control agent, poly(2-ethyl-2-oxazoline), was obtained from Aldrich.

The initiator, Vazo 52, 2,2'-azobis(2,4-dimethylvaleronitrile), was obtained from DuPont Company.

A promoter, poly(methylamino ethanol adipate) oligomer (AMAE) that was used to promote the adsorption of silica to droplet surface was prepared by condensation polymerization of amino ethanol and adipic acid.

Potassium dichromate was used to inhibit formation of water soluble polymer and was obtained from Aldrich.

The elastomeric material NOTIO™ was obtained from Mitsui Chemicals American, Inc.

The crosslinking agent CX100 is a polyfunctional aziridine that was obtained from DSM NeoResins.

The marker materials used were cyan and magenta pigments. The cyan (C) pigment PB 15:3 (Sunfast Blue 15:3) was obtained from Sun Chemicals. The magenta (M) pigment PR 122 (Toner Magenta E02) was obtained from Clariant. These pigments were milled in water using dispersants prior to incorporation in the first and second aqueous phases. The cyan "millgrind" (CM) was made using Solsperse® 43000 (30 weight % with respect to pigment) as the dispersant at 18 weight % of pigment. The magenta "millgrind" (MM) was made using Disperbyk® 190 (25 weight % with respect to pigment) as the dispersant at 16 weight % of pigment.

One of the black marker materials used was a hydrophobic carbon black (CB) Toolkit C, obtained from Cabot Corporation. The CB mill grind (CBM) was made using Solsperse® 43000 (25 weight % with respect to CB) at 16 weight % pigment. The other was a hydrophobic CB made in-house from surface modification of Regal 330 (Cabot Corporation), the mill grind of which (CBM1) was made using Solsperse® 43000 (25 weight % with respect to CB) at 12 weight % pigment.

The size and shape of the porous particles were measured using a Sysmex FPIA-3000 automated particle shape and size analyzer from Malvern Instruments. In this method, samples were passed through a sheath flow cell that transformed the particle suspension into narrow or flat flow, ensuring that the largest area of the particle is oriented towards the camera and that all particles are in focus. The CCD camera captures 60 images every second and these were analyzed in real time. Numerical evaluation of particle shape was derived from measurement of the area of the particle. A number of shape factors were calculated including circularity, aspect ratio, and circle equivalent diameter. Aspect ratio (AR) is defined as described above. The reported size of the particles is the mode value of the particle size distribution where mode represents the size that occurs most frequently.

The porosity of the porous particles was measured using mercury intrusion porosimetry.

The crosslinked organic porous particles prepared according to this invention were evaluated using optical microscopy at both 600× and 1000× magnification for visualizing the marker materials in the discrete pores. The test used for evaluating robustness of the crosslinked organic porous particles in a coating lacquer such as a UV curable composition, was suspending the particles in propyl acetate for 24 hours or more followed by microscopic examination to look for particle integrity. Propyl acetate was chosen since it is a good solvent for a wide variety of non-crosslinked binders.

The crosslinked and non-crosslinked organic porous polymer particles used in the Examples were made using the following procedures:

Control 1

Non-Crosslinked Organic Porous Particle Containing 4 Weight % Cyan Marker Materials A first organic phase (105 g) containing 75 weight % of methyl methacrylate, 25 g of styrene, 2 g of Tetronic 150R1, and 3.0 g of Vazo® 52 was emulsified with the first aqueous phase containing 9.2 g of a 6.8 weight % of CMC and 22.2 g of CM using the Silverson Mixer followed by homogenization in the Microfluidizer® at 9800 psi (690 kg/cm$^2$). An 80 g aliquot of the water-in-oil emulsion was added to the third aqueous phase consisting of 111 g of a 200 mmolar citrate phosphate buffer at pH 4, 7.1 g of Nalco 1060, and 0.9 g of a 10 weight % AMAE promoter in water and was emulsified using the Silverson Mixer fitted with a General-Purpose Disintegrating Head for two minutes at 2000 RPM, followed by homogenization in an orifice disperser at 1000 psi (70.4 kg/cm$^2$) to form a water-in-oil-in-water emulsion. This emulsion was polymerized at 55° C. for 16 hours under nitrogen and then at 70° C. for 4 hours. The resultant non-crosslinked organic porous particles were isolated in a fitted glass funnel followed by washing with water and drying. These non-crosslinked, cyan-colored porous particles had a nominal particle size of 13.5 μm, an AR of 0.96, a porosity of 20%, and distinct cyan pores. Some of the non-crosslinked organic porous particles were added to propyl acetate and held for 24 hours. It was observed that these particles had swollen and began to dissolve in the propyl acetate at the end of the time period.

Control 2

Non-Crosslinked Organic Porous Particles (Containing 4 Weight % Cyan and Magenta Marker Materials A first organic phase (289 g) containing 17 weight % of Kao E-B, in ethyl acetate was emulsified using the Silverson Mixer followed by homogenization in the Microfluidizer® at 9800 psi (690 kg/cm$^2$) with a first aqueous phase prepared with 36.81 g of a 2.4 weight % of CMC and 16 g of CM to give a first cyan water-in-oil emulsion. A second water-in-oil emulsion was prepared with 331 g of a second organic phase consisting of 17 weight % of Kao EB, in ethyl acetate and was emulsified with a second aqueous phase containing 40.45 g of a 2.4 weight % solution of CMC and 20 g of MM in the same manner as the first water-in-oil emulsion. A 300 g aliquot of the first water-in-oil emulsion and a 300 g aliquot of the second water-in-oil emulsion were combined with gentle mixing. This mixture of first and second water-in-oil emulsions was then added to a third aqueous phase consisting of 960 g of a 200 mmolar citrate phosphate buffer at pH 4 and 19.7 g of Nalco 1060 and was emulsified using the Silverson Mixer fitted with a General-Purpose Disintegrating Head for two minutes at 2000 RPM, followed by homogenization in an orifice disperser at 1000 psi (70.4 kg/cm$^2$) to form a water-in-oil-in-water emulsion. This emulsion was then diluted with an equal weight of water. The ethyl acetate was evaporated using a Heidolph Laborata rotary evaporator at 40° C. under reduced pressure. The resulting suspension of beads was isolated in a fitted glass funnel followed by washing with water and drying.

The purplish colored non-crosslinked organic porous particles had a mode particle size of 14.6 μm, an AR of 0.98, and a porosity of 28%. They had distinct cyan and magenta markers in separate discrete pores. Some of the non-crosslinked organic porous particles were added to propyl acetate and held for 24 hours. It was observed that the particles had swollen and began to dissolve in the propyl acetate at the end of the time period.

Invention Example 1

Crosslinked Organic Porous Particles Containing Carbon Black (7.5 weight %) in Discrete Pores A first organic phase (190 g) containing 52.3 weight % of CN968, 42.4 weight % of methyl methacrylate, 2.1 weight % of Tetronic® 150R1, and 3.1 weight % of Vazo® 52 was emulsified with the first aqueous phase made up of 89.7 g of CBM (containing of 2 weight % of CMC) using the Silverson Mixer followed by homogenization in the Microfluidizer® at 9800 psi (689 kg/cm²). A 170 g aliquot of the first water-in-oil emulsion was added to the third aqueous phase consisting of 236 g of a 200 mmolar citrate phosphate buffer at pH 4 and 16.5 g of Ludox® TM, and was emulsified using the Silverson Mixer fitted with a General-Purpose Disintegrating Head for two minutes at 2000 RPM, followed by homogenization in an orifice disperser at 1000 psi (70.3 kg/cm²) to form a water-in-oil-in-water emulsion. This emulsion was polymerized at 55° C. for 16 hours under nitrogen and then at 70° C. for 4 hours. The resulting spherical crosslinked organic porous particles were isolated in a fitted glass funnel followed by washing with water and drying. The black-colored crosslinked organic porous particles had a mode particle size of 8.2 μm and a porosity of 30% by Hg intrusion porosimetry. These dry particles were loaded into a flexible low density, transparent elastomer material NOTIO™, at 50 weight % by mixing in a Brabender at 220 C and 15 rpm over a 10 minute period followed by another 5 minutes at 45 rpm. The sample was then pressed between 2 pieces of Kapton® polyimide film (DuPont) at 200° C. in a Carver Press for 5 minutes at 3500 psi (246 kg/cm²) of pressure. Cross-sections of the crosslinked organic porous particle loaded elastomer showed that the crosslinked organic porous particles were intact and had not collapsed despite their exposure to high pressure and temperature.

Invention Example 2

Crosslinked Organic Porous Particles Containing Cyan and Magenta Marker Materials (4 weight %) in Discrete Pores A first organic phase (196 g) containing 52.3 weight % of CN968, 42.4 weight % of methyl methacrylate, 2.1 weight % of Tetronic® 150R1, and 3.1 weight % of Vazo® 52 was emulsified with the first aqueous phase prepared with 17.5 g of a 10 weight % of CMC and 72.2 g of CM as described in Invention Example 1. A second water-in-oil emulsion was prepared with the second organic phase the same as the first organic phase, and the second aqueous phase containing 17.5 g of a 10 weight % solution of CMC and 72.2 g of MM in the same manner as the first water-in-oil emulsion. An 85 g aliquot of each of the first and second water-in-oil emulsions were mixed together gently and added to the third aqueous phase consisting of 118 g of a 200 mmolar citrate phosphate buffer at pH 4, 4 g of Ludox® TM, and 3 g of 10 weight % AMAE promoter in water was emulsified, polymerized, and as isolated as described in Invention Example 1. The resulting purple-colored crosslinked organic porous particles had a mode particle size of 13.5 μm, an AR of 0.73, a porosity of 16%, and distinct cyan and magenta markers in discrete pores. The crosslinked organic porous particles were added to propyl acetate and held for 24 hours. The crosslinked organic porous particles showed no noticeable swelling or dissolution compared to the non-crosslinked organic porous particles of Control 1 and the separate markers were distinctly visible.

The crosslinked organic porous particles of Invention Example 2 were dispersed as a dry powder in a commercial UV-curable lacquer using a touch-activated vibrating shaker for a couple of minutes. The resulting mixture was then coated onto a paper substrate using a Flexi Proofer, consisting of an Anilox roller (145 lines per inch, 368 lines per cm), doctor blade, and rubber transfer roller. After this coating onto the paper substrate, the coating was passed through a Fusion UV Systems P300MT at a speed of 100 feet/min. (3.048 m/min.) to harden the coating.

Using microscopy as described above, the coating was examined to determine the ease of visual distinction of first and second marker materials in discrete pores. In the coatings thus prepared for Invention Example 2, distinct domains of cyan and magenta marker materials could be seen.

Invention Example 3

Crosslinked Organic Porous Particles Containing Cyan and Magenta Marker Materials (3.9 weight %) in Discrete Pores A first organic phase (196 g) containing 20 weight % of CN301, 59 weight % of methyl methacrylate, 1 weight % of EFKA 6220, 16 weight % of ethyl acetate, 1.6 weight % of Tetronic® 150R1, and 2.4 weight % of Vazo® 52 was emulsified with the first aqueous phase prepared with 1.3 g of 100 weight % CMC in 11.65 g of water and 33.7 g of CM as described in Invention Example 1. A second water-in-oil emulsion was prepared with the second organic phase the same as the first organic phase, and the second aqueous phase containing 47 g of a 1.9 weight % solution of CMC and 40 g of MM in the same manner as the first water-in-oil emulsion. An 150 g aliquot of each of the first and second water-in-oil emulsions were mixed together gently and added to the third aqueous phase consisting of 417 g of a 200 mmolar citrate phosphate buffer at pH 4, 19.6 g of Nalco™ 1060, and 2.6 g of 10 weight % AMAE promoter in water was emulsified, polymerized, and isolated as described in Invention Example 1. The resulting purple-colored crosslinked organic porous particles had a mode particle size of 15 μm, an AR of 0.94, a porosity of 21%, and distinct cyan and magenta markers in discrete pores. The crosslinked organic porous particles were added to propyl acetate and held for 24 hours. The crosslinked organic porous particles showed no noticeable swelling or dissolution compared to the non-crosslinked organic porous particles of Control 1 and the separate markers were distinctly visible by microscopy.

Invention Example 4

Crosslinked Organic Porous Particles Containing Cyan and Magenta Marker Materials (4 weight %) in Discrete Pores A first organic phase (98 g) containing 18 weight % of Kao E and 0.2 weight % of EFKA 6225, in ethyl acetate was emulsified with a first aqueous phase prepared with 23.8 g of a 2.5 weight % of CMC and 8.4 g of CM as described in Invention Example 1 to give a first cyan water-in-oil emulsion. A second water-in-oil emulsion was prepared with 98 g of a second organic phase consisting of 18 weight % of Kao E and 0.2 weight % of EFKA 6225 in ethyl acetate was emulsified with a second aqueous phase containing 24.1 g of a 2.5 weight % solution of CMC and 8 g of MM in the same manner as the first water-in-oil emulsion. A 25 g aliquot of the first water-in-oil emulsion and a 25 g aliquot of the second water-in-oil emulsion were then added to 50 g of a 13.7 weight % solution of Kao E containing 0.07 g of EFKA 6225 in ethyl acetate and 0.25 g CX100 with gentle mixing. This mixture of first and second water-in-oil emulsions was then added to a third aqueous phase consisting of 162 g of a 200 mmolar citrate phosphate buffer at pH 4 and 5 g of Nalco™ 1060 and emulsified as described in Invention Example 1, to form a water-in-oil-in-water emulsion. This emulsion was then diluted with an equal weight of water containing a 0.03 weight % solution of PEOX. The ethyl acetate was evaporated using a Heidolph Laborata rotary evaporator at 40° C. under reduced pressure for 30 minutes followed by 45 C for 45 minutes to complete the crosslinking reaction of CX100. The resulting purplish-colored crosslinked organic porous particles were isolated as described in Invention Example 1 and had a mode particle size of 15.4 µm, an AR of 0.80, and a porosity of 40%. They had distinct cyan and magenta markers in separate discrete pores. The crosslinked organic porous particles were added to propyl acetate and held for 24 hours. They showed a little swelling but no dissolution compared to the non-crosslinked organic porous particles of Control 2.

Invention Example 5

Crosslinked Organic Porous Particles Containing a Cyan Marker Material (4 weight %) in Discrete Pores Crosslinked organic porous particles were prepared the same as for Control 1 except that the first organic phase contained 75 g methyl methacrylate, 15 g styrene, and 10 g of ethylene glycol dimethacrylate. The resulting cyan-colored crosslinked organic porous particles had a mode particle size of 13.2 µm, an AR of 0.971, a porosity of 25%, and distinct cyan pores. They were added to propyl acetate and held for 24 hours. The crosslinked organic porous particles showed no swelling or dissolution compared to the non-crosslinked organic porous particles of Control 1.

Invention Example 6

Crosslinked Organic Porous Particles Containing Carbon Black (10 weight %) in Discrete Pores A first organic phase (243.7 g) containing 81 weight % ethyl acetate, 9 weight % of CN301, 9 weight % of 2-ethylhexyl methacrylate, 0.4 weight % of PGPR 90, and 0.6 weight % of Vazo® 52 was emulsified with the first aqueous phase made up of 80 grams of a 3.75 weight % CMC and 82.5 g of CBM 1 using the Silverson Mixer followed by homogenization in the Microfluidizer® at 9800 psi (689 kg/cm$^2$). A 250 g aliquot of the first water-in-oil emulsion was added to the third aqueous phase consisting of 400 g of a 200 mmolar citrate phosphate buffer at pH 4, 16 g of Nalco® 1060 and 2 g of a 10 weight % AMAE promoter solution in water, and emulsified using the Silverson Mixer fitted with a General-Purpose Disintegrating Head for two minutes at 2000 RPM, followed by homogenization in an orifice disperser at 1000 psi (70.3 kg/cm$^2$) to form a water-in-oil-in-water emulsion. This emulsion was diluted 1:1 with water followed by addition of 3 ml of a 2.5 weight % potassium dichromate to scavenge water soluble free radicals and polymerized at 55° C. for 1 hour under nitrogen. This was followed by removal of ethyl acetate under reduced pressure using a rotary evaporator as in Example 4. The polymerization was then continued at 55° C. for 16 hours under nitrogen and then at 70° C. for 4 hours. The resulting spherical crosslinked organic porous particles were isolated in a fritted glass funnel followed by washing with water and drying. The black-colored crosslinked organic porous particles had a mode particle size of 6.8 µm, an AR of 0.965, and a porosity of 50%. These dry particles were added to propyl acetate and held for 24 hours. The crosslinked organic porous particles showed no swelling or dissolution after that time period. These dry particles were also loaded into a flexible low density, transparent elastomer material NOTIO™ at 50 weight % by mixing in a Brabender at 220° C. and 15 rpm over a 10 minute period followed by another 5 minutes at 45 rpm. The sample was then pressed between 2 pieces of Kapton® polyimide film (DuPont) at 200° C. in a Carver Press for 5 minutes at 3500 psi (246 kg/cm$^2$) of pressure. Cross-sections of the particle loaded elastomer showed that the crosslinked organic porous particles were intact and had not collapsed despite their exposure to high pressure and temperature.

The invention has been described in detail with particular reference to certain preferred embodiments thereof, but it will be understood that variations and modifications can be effected within the spirit and scope of the invention.

The invention claimed is:

1. A method for preparing a crosslinked organic porous particle comprising:

providing a first water-in-oil emulsion comprising a first pore stabilizing hydrocolloid in a first aqueous phase that is dispersed in a first oil phase, which first oil phase comprises a first polyfunctional reactive compound, a first reagent that causes crosslinking, optionally at least one first ethylenically unsaturated polymerizable monomer, and optionally a first organic solvent, providing a second water-in-oil emulsion comprising a second pore stabilizing hydrocolloid in a second aqueous phase that is dispersed in a second oil phase, which second oil phase comprises a second polyfunctional reactive compound, a second reagent that causes crosslinking, optionally at least one ethylenically unsaturated polymerizable monomer, and optionally a second organic solvent, combining the first and second water-in-oil emulsions to form a third water-in-oil emulsion containing a mixture of the first and second oil phases and distinct droplets of the first and second aqueous phases, dispersing the third water-in-oil emulsion in a third aqueous phase containing a surface stabilizing agent to form a water-in-oil-in-water emulsion containing droplets of the third water-in-oil emulsion, which third water-in-oil emulsion droplets contain the distinct droplets of the first and second aqueous phases, and polymerizing the polyfunctional reactive compounds and optionally the ethylenically unsaturated polymerizable monomers to form a precursor crosslinked organic porous particle having a crosslinked organic solid phase including an external particle surface, and first and second discrete pores, being isolated from each other and dispersed within the crosslinked organic solid phase, removing, if present, the first and second organic solvents to produce an aqueous suspension of the precursor crosslinked organic porous particle, and isolating the precursor crosslinked organic porous particle to provide a crosslinked organic porous particle.

2. The method of claim 1 wherein the first water-in-oil emulsion further comprises a first marker material that is incorporated into the first discrete pores, and wherein the second water-in-oil emulsion further comprises a second marker material that is incorporated into the second discrete pores.

3. The method of claim 2 wherein at least one of the first and second marker materials is selected from the group consisting of colored pigments or dyes, fluorescing materials, radioisotopes, luminescing compounds, particles of metal and metal-containing compounds having magnetic moments, luminescing compounds, and bioactive materials.

4. The method of claim 1 wherein the surface stabilizing agent is a poly(vinyl pyrrolidone), poly(vinyl alcohol), colloidal silica, fumed silica, clay particles, polymer latex particles, or any combination thereof.

5. The method of claim 1 wherein the surface stabilizing agent is present in an amount of at least 0.1 weight % and up to an including 10 weight % of the water-in-oil-in-water emulsion.

6. The method of claim 1 wherein the surface stabilizing agent is colloidal or fumed silica that is present in an amount of at least 0.2 weight % and up to and including 5 weight % of the water-in-oil-in-water emulsion.

7. The method of claim 1 wherein one or both of the first and second oil phases comprise a colorant, release agent, charge control agent, shape control agent, compatibilizer, wetting agent, surfactant, plasticizer, wax, or lubricant, or any combination of these materials.

8. The method of claim 1 wherein at least one of the first and second aqueous phases comprises a buffering salt.

9. The method of claim 1 further comprising drying the crosslinked organic porous particle.

10. The method of claim 1 wherein the first or second oil phases comprises an organic solvent that is selected from the group consisting of ethyl acetate, propyl acetate, chloromethane, dichloromethane, vinyl chloride, trichloromethane, carbon tetrachloride, ethylene chloride, trichloroethane, toluene, xylene, cyclohexanone, dimethyl carbonate, and 2-nitropropane, and a mixture of two or more of these solvents.

11. The method of claim 1 wherein after forming the water-in-oil-in-water emulsion and before polymerizing, water is added to the water-in-oil-in-water emulsion.

12. The method of claim 1 wherein the weight ratio of the first water-in-oil emulsion to the second water-in-oil emulsion combined in the third water-in-oil emulsion is from 1000:1 and up to and including 0.01:1.

13. The method of claim 1 comprising dispersing the third water-in-oil emulsion in the third aqueous phase using a capillary orifice device.

14. The method of claim 13 comprising dispersing the third water-in-oil emulsion in the third aqueous phase using a back pressure of at least 100 psi (7 kg/cm$^2$) and up to and including 5000 psi (351.5 kg/cm$^2$) using a flow rate of at least 1000 ml/min. and up to and including 6000 ml/min.

15. The method of claim 1 further comprising:
combining one or more additional water-in-oil emulsions, each comprising a pore stabilizing hydrocolloid in one or more additional aqueous phases that are dispersed in one or more additional oil phases each, and each oil phase containing a polyfunctional reactive compound, a reagent that causes crosslinking, optionally an ethylenically unsaturated polymerizable monomer, and optionally an organic solvent,
with the first and second water-in-oil emulsions so that the third water-in-oil emulsion contains distinct droplets of the first, second, and the one or more additional aqueous phases.

16. The method of claim 15 wherein at least one of additional water-in-oil emulsions contains a marker material.

17. The method of claim 15 further comprising at least one additional water-in-oil emulsion that contains no marker materials.

18. The method of claim 1 wherein the first and second pore stabilizing hydrocolloids are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropanesulfonate), a polyphosphate, and mixtures thereof.

19. The method of claim 1 wherein the first and second pore stabilizing hydrocolloids are different, resulting in a crosslinked organic porous particle having first discrete pores that are different in size from the second discrete pores.

20. The method of claim 1 wherein the concentrations of the first and second pore stabilizing hydrocolloids are different in the first and second aqueous phases, resulting in a crosslinked organic porous particle having first discrete pores that are different in size from the second discrete pores.

21. The method of claim 1 that provides a crosslinked organic porous particle having an aspect ratio of at least 0.95.

22. The method of claim 1 that provides a crosslinked organic porous particle having an aspect ratio of at least 0.1 and up to and including 0.95.

23. The method of claim 1 wherein at least one of the first and second oil phases contains a shape control agent.

24. The method of claim 1 wherein the third aqueous phase contains a shape control agent.

25. The method of claim 1 that provides a crosslinked organic porous particle having an aspect ratio of at least 0.4 and up to and including 0.95 by including a fatty acid modified polyester, polyethyloxazoline, or a phosphate ester of an alkoxylated phenol in the first, second, or third aqueous phase or in the first or second oil phase.

26. The method of claim 1 comprising polymerizing by the application of heat or polymerization radiation to the water-in-oil-in-water emulsion.

27. The method of claim 1, wherein the first organic solvent is present in the first oil phase and the second organic solvent is present in the second oil phase, and the method further comprises:
partially polymerizing the polyfunctional reactive compounds,
removing the first and second organic solvents, and
continuing the polymerization of the polyfunctional reactive compounds, to form a precursor crosslinked organic porous particle having a crosslinked organic solid phase including an external particle surface, and first and second discrete pores, being isolated from each other and dispersed within the crosslinked organic solid phase.

* * * * *